Aug. 30, 1949.　　　　E. G. BUSSE　　　2,480,219
BRAKE GEAR SUPPORT
Filed Nov. 10, 1945

INVENTOR
EDWIN G. BUSSE

BY Rodney Bedell
ATTORNEY

Patented Aug. 30, 1949

2,480,219

UNITED STATES PATENT OFFICE 2,480,219

BRAKE GEAR SUPPORT

Edwin G. Busse, Chicago, Ill., assignor to Chicago Railway Equipment Company, Chicago, Ill., a corporation of Illinois Application November 10, 1945, Serial No. 627,845

5 Claims. (Cl. 188—210)

1

The invention relates to the safeguarding and supporting of railway truck brake gear and is particularly adapted for association with the spring plank, or like main truck part, to form a safety guard for the bottom connection rod extending between the brake beams at opposite ends of the truck.

One object of the invention is to provide a device which is economical to manufacture and easy to apply to and remove from the spring plank.

Another object is to avoid punching, drilling, or notching of the spring plank to provide for the application of the support. Such machining of the spring plank is objectionable because it may weaken the spring plank to the extent that vibrations or undue stress will cause the spring plank to fail eventually.

These and other detailed objects as will appear from the following description are attained by the structure illustrated in the accompanying drawings in which.

Figure 1:
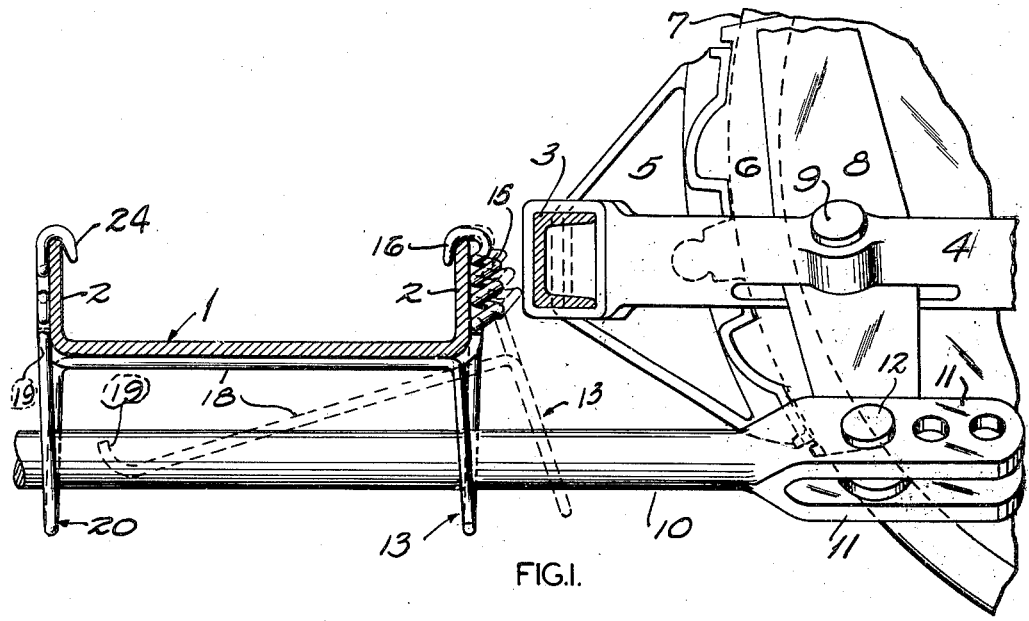
Figure 1 is a vertical section taken longitudinally through a restricted portion of a four-wheel truck and showing the spring plank, one of the brake levers and beams, and the adjacent portion of the bottom connection rod connecting the brake lever shown to the brake lever of the other brake beam (not shown).

The truck spring plank 1 is shown as a channel-shaped plate with its flanges 2 extending upwardly. The spring plank is positioned intermediate the brake beams, one of which is indicated by the channel compression member 3 and the strut 4 forming parts of a standard truss type beam, each end of which mounts a brake head 5 having a shoe 6 for application to the wheel 7. A brake lever 8 extends through strut 4 and is pinned thereto at 9, and the lower end of lever 8 is connected to the corresponding lever at the other end of the truck by a bottom connection 10, preferably consisting of a round rod with jaws 11 adapted to receive the lower end of lever 8 between them to which it is pivoted by a pin 12.

Normally, bottom connection 10 is supported by lever 8 which is carried by the brake beam through the usual brake hangers, but in the event

2 of failure of the brake hangers, or of the pins 9 or 12, it is desired to safeguard the bottom connection from falling to the track which would tend to seriously damage the brake gear and possibly derail the truck.

To prevent such dropping of the bottom connection, there is provided a safety guard (which, if desired, could be used as a normal support) formed from an elongated rod or bar comprising a loop 13, one leg 14 of which merges in a coil 15, the upper end of the coil terminating in a downturned hook 16 adapted to engage the upper edge of one of the spring plank channels 2. The upper portion of the other leg 17 of the loop merges with a horizontal section 18 extending first towards leg 14 and then substantially at right angles alongside the under face of the web of the spring plank channel 1 and terminating at the end remote from the loop in an upturned hook 19 which engages the corner formed by the channel web and upstanding flange and holds the loop and coil 15 against movement away from the side of the spring plank to which they are applied.

The elasticity of the metal in loop 13 and the coils 15 is such that hook 16 may be applied to the upper edge of one spring plank flange with the coil and loop inclined downwardly and outwardly as indicated in broken lines in Figure 1 and then the device may be swung to the left to the full line position in which coils 15 will hold arm 18 against the bottom of the spring plank and the distortion of the loop will hold hook 19 tightly against the remote flange 2. Thus the device is securely held in position and will not slide lengthwise of the beam. Its application and holding is effected without requiring a hole or a notch in the spring plank. Loop 13 is substantially closed at its upper end and any load from rod 10 will be applied directly below hook 16 and along the axis of spring 15. If the load is heavy enough, the spring may yield without unseating element 18 from the bottom of the spring plank. The horizontal extension to the right (Figure 3) from the upper end of leg 17 prevents the device from turning about element 18 in a vertical plane corresponding to that of the loop.

Figure 3:
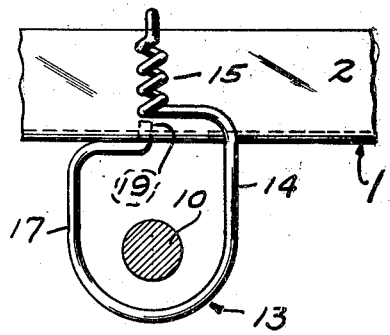
Figure 3 is a side elevation of the same structure looking towards the right-hand side of the figure.
Figure 4:
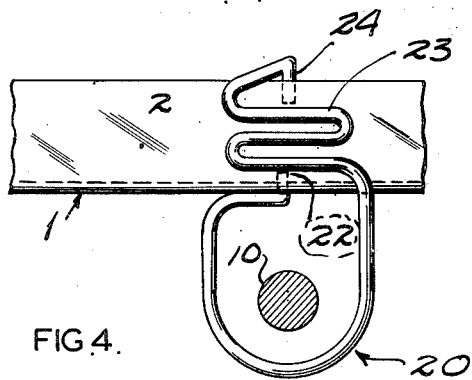
Figure 4 is a side elevation of the same structure looking towards the left-hand side of the figure.

After application of the device to the spring plank, the connecting rod is passed through loop 13 and assembled with the brake levers. Normally, the connecting rod will clear the loop as indicated in Figure 3, but if the rod should drop, it will be held by the loop against falling to the track.

Figure 2:
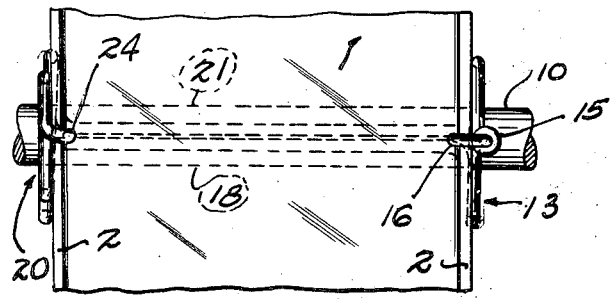
Figure 2 is a top view of the spring plank and the support applied thereto.

Preferably a support is provided at each side of the spring plank as indicated in Figures 1 and 2. These devices may be duplicates of each other, but in the patent drawings, there is shown an alternative structure at the left-hand side of the spring plank. This structure comprises a loop 20 corresponding to loop 13 and having a horizontal arm 21 corresponding to arm 18 and similarly terminating in an upturned hook 22 engaging the lower right-hand corner of the spring plank. The coil 23 merging with the other leg of the loop is formed in a flat plane and lies close against the spring plank flange 2 and terminates at its upper end in a hook 24 corresponding to the hook 16 previously described. This device is applied and functions in substantially the same manner as the device at the right-hand side of the spring plank.

It will be apparent to those skilled in the art that these devices are easily made by bending a straight rod to the form shown and without machining operations. The devices are readily applied to the spring plank without any machining of the latter and are readily removed from the spring plank when it is desired to disassemble the brake gear for repairs or other purposes.

It will be understood that the structure may be otherwise varied in detail without departing from the spirit of the invention and the exclusive use of those modifications coming within the spirit of the claims is contemplated.

What is claimed is:

1. A railway brake gear support adapted to be mounted on a railway truck part and comprising a one-piece rod forming a downwardly facing hook at one end arranged to engage an upwardly facing surface on the truck part, and an upwardly facing member at the other end adapted to engage a downwardly facing surface on the truck part and also forming between its ends a supporting loop for a brake gear part, said hook, member and loop being substantially rigid, the rod also forming a spring-like structure between said hook and loop.

2. A railway brake gear support as described in claim 1 in which the member for engaging a downwardly facing surface on the truck part extends, at least in part, transversely of the loop in the general plane of the loop to hold the support against turning in a vertical plane corresponding to that of the loop.

3. A railway brake gear support as described in claim 1 in which the hook and member, arranged to engage, respectively, upwardly and downwardly facing surfaces of the truck part, are disposed substantially one above the other and the portion between the hook and member is disposed to engage one side of the truck part, and the truck part engaging member has an extension with an up-turned lip to engage the opposite side of the truck part.

4. A brake gear support comprising an upright spring, a downwardly facing hook formed at the upper end of said spring, a loop depending from said spring to receive a brake gear member, an arm extending horizontally from said loop and spaced below said hook, and an upwardly facing hook at the end of said arm remote from said spring.

5. In a brake gear support, a railway truck spring plank channel with upstanding flanges, a rod forming a vertically disposed spring coil, there being a hook at the upper end of said spring engaging the upper edge of a flange at one side of said channel, a brake gear receiving loop depending from said spring, and a rod extending from said loop alongside the bottom of said channel and terminating in a hook engaging the opposite side of the channel to distort the loop and grip the channel.

EDWIN G. BUSSE.

REFERENCES CITED

The following references are of record in the file of this patent:

UNITED STATES PATENTS

| Number | Name | Date |
| --- | --- | --- |
| 2,047,455 | Anderson | July 14, 1936 |
| 2,067,588 | Zweibel | Jan. 12, 1937 |
| 2,167,712 | Fine | Aug. 1, 1939 |